United States Patent [19]
Goldberg

[11] 3,823,308
[45] July 9, 1974

[54] CREDIT CARD VERIFIER

[76] Inventor: Kenneth M. Goldberg, Three Lakes St., Lynnfield, Mass. 01940

[22] Filed: Dec. 20, 1971

[21] Appl. No.: 210,272

Related U.S. Application Data

[63] Continuation of Ser. No. 880,265, Nov. 26, 1969, abandoned.

[52] U.S. Cl. ....... 235/61.7 B, 179/2 CA, 179/2 DP, 340/149 A
[51] Int. Cl. ..................... G06k 5/00, H04m 11/00
[58] Field of Search ............ 235/61.7 B; 340/149 A, 340/365; 221/1, 2; 194/4; 179/2 CA, 2 DP, 6.3 LL; 178/1, 17

[56] References Cited
UNITED STATES PATENTS

| | | | |
|---|---|---|---|
| 2,319,321 | 5/1943 | Head | 179/90 FW |
| 2,522,119 | 9/1950 | Kaelin | 340/365 R X |
| 3,308,238 | 3/1967 | Brothman et al. | 235/61.7 B X |
| 3,407,388 | 10/1968 | Goldman | 235/61.7 B X |
| 3,476,876 | 11/1969 | Myrick | 340/365 R X |
| 3,557,311 | 1/1971 | Goldstein | 179/2 DP |
| 3,634,656 | 1/1972 | Krechmer et al. | 235/61.7 B |

*Primary Examiner*—Thomas J. Sloyan

[57] ABSTRACT

A low cost credit card verifier unit for use in conjunction with a time-shared central processing unit (CPU) or computer in a credit card verification system. The unit includes a tone generator for generating a series of ten tones identifying the code on a credit card whose status is to be checked. Ten adjustable digit set buttons are manually positioned in accordance with the code on the credit card. In one form of the invention, after the verifier unit is connected to the CPU via a telephone line, a roller is moved from a starting position sequentially over the positioned buttons to depress them and cause them to operate the tone generator which transmits to the CPU a series of ten tones corresponding to the code on the card. After the roller has traversed all the buttons, it is now in a second position. Upon receipt of the tones, the CPU sends back to the verifier unit a status signal of the credit card. Moving the roller back to its starting position resets the circuits of the verifier unit to permit another credit card code to be sent to the CPU. The verifier unit also contains means for accessing the CPU and a ready light which is energized by a ready signal transmitted by the CPU when the CPU is ready to accept data. A movable stop on the verifier unit normally prevents the roller from leaving its starting position, but the stop is depressed upon energization of the ready light to permit movement of the roller across the digit set buttons to a second position. Another stop normally prevents the roller from returning from its second position to its starting position, but this stop is depressed by energization of either a status lamp or repeat lamp on the verifier unit. The repeat lamp is energized by a repeat signal transmitted by the CPU when an invalid code is transmitted or upon a CPU malfunction. The repeat lamp is also energized if no signal is received from the CPU a predetermined time after computer access has been indicated. The roller may then be returned to its starting position where it actuates a reset button which de-energizes all the indicating lamps. After each status or repeat signal, the CPU also transmits a disconnect signal which automatically disconnects the verifier unit from the telephone line, thereby keeping telephone company time charges to a minimum. The credit card verifier unit also contains an additional foreign company digit set button for identifying to the CPU the name of the company which issued the particular credit card to be verified. This button is also depressed by the roller and transmits along with the credit card code tones an additional tone identifying the company.

19 Claims, 13 Drawing Figures

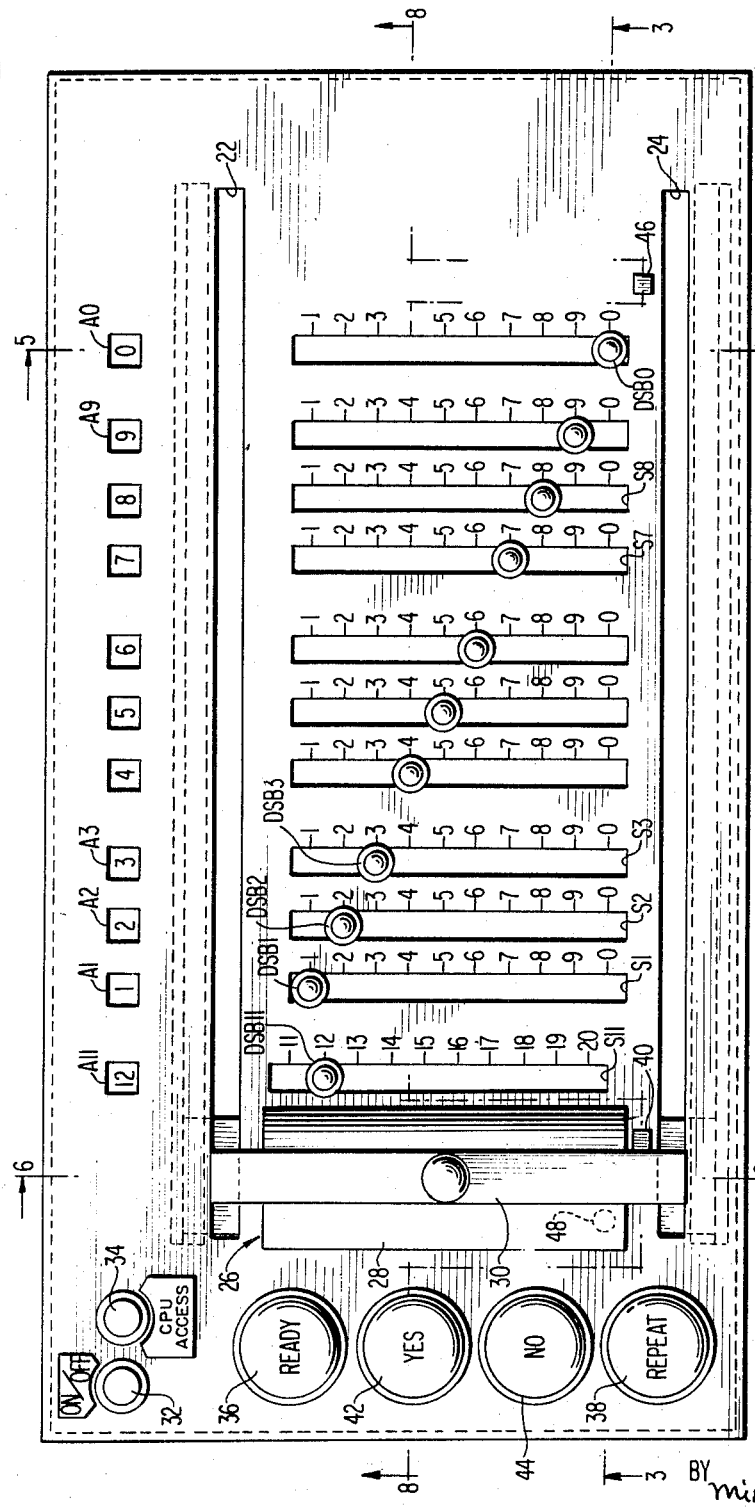

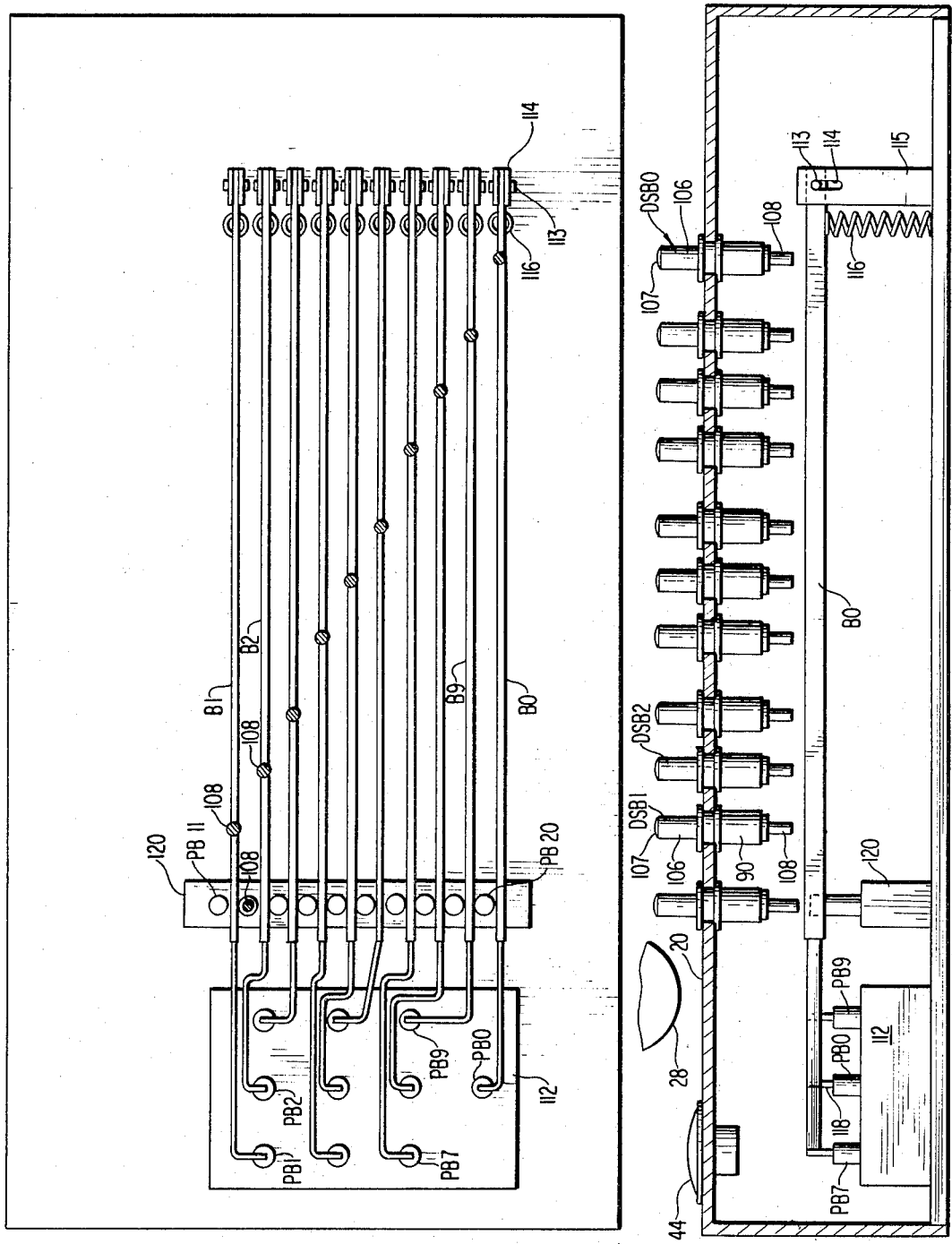

PATENTED JUL 9 1974 3,823,308
SHEET 3 OF 5
FIG. 5
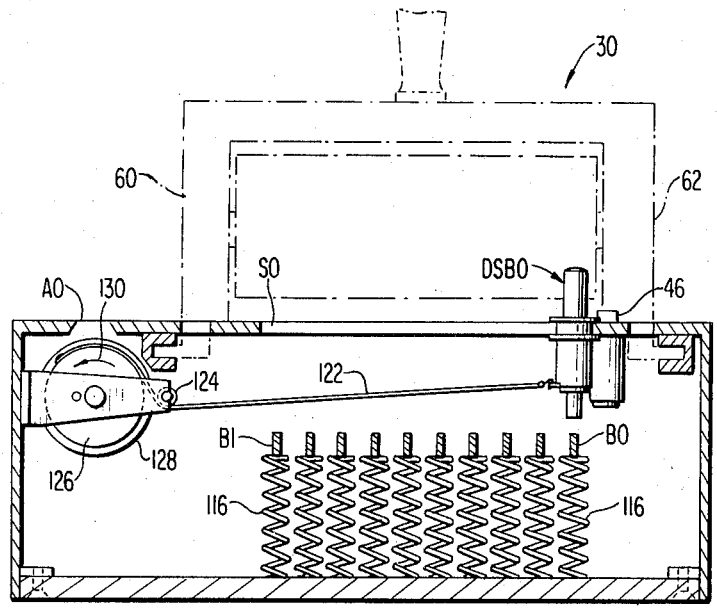
FIG. 6
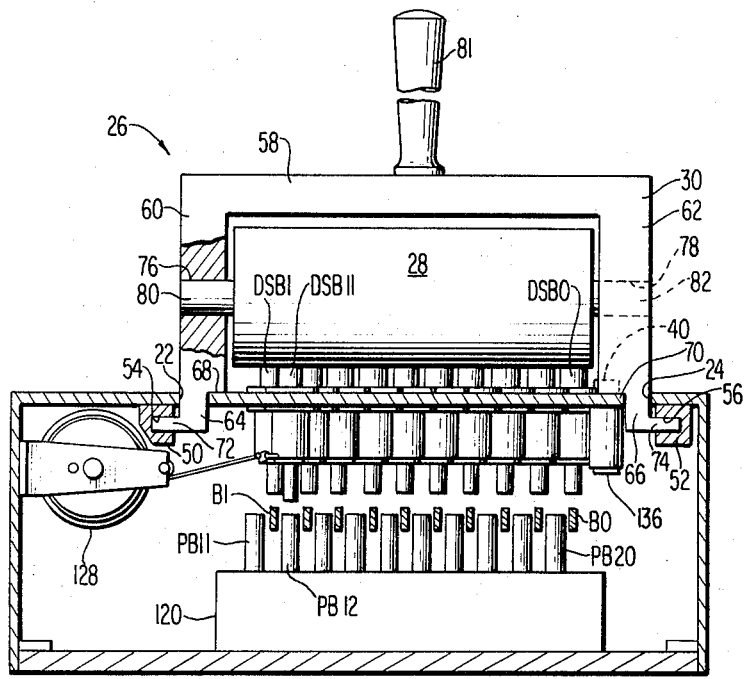
FIG. 7
FIG. 12

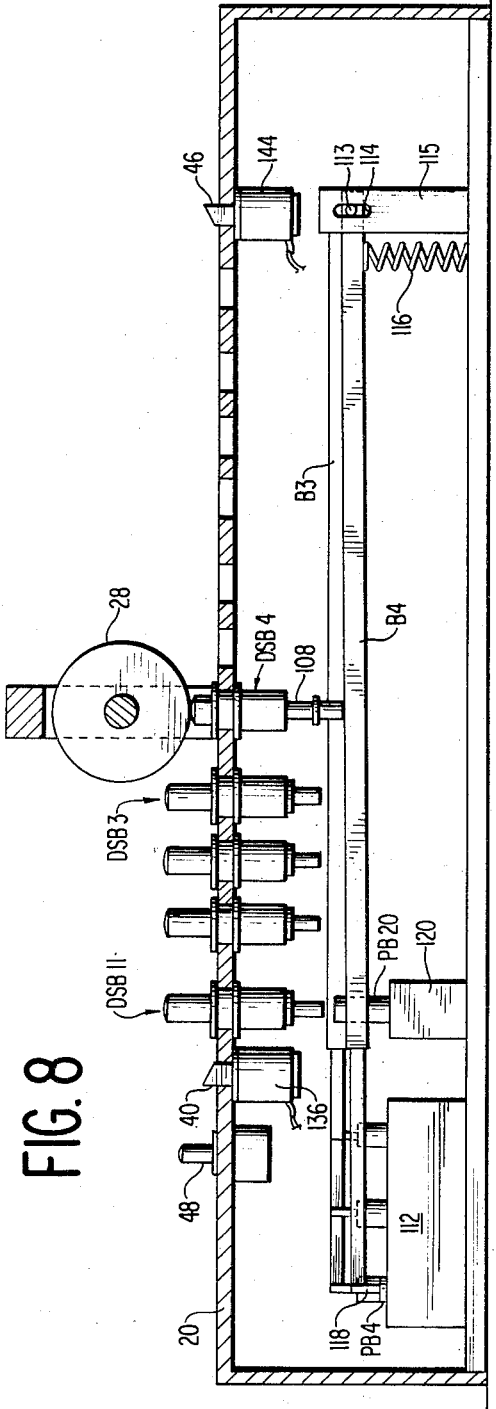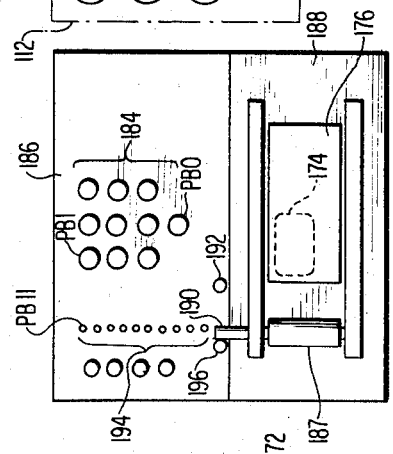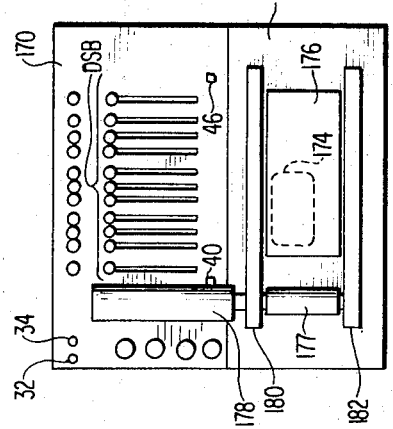

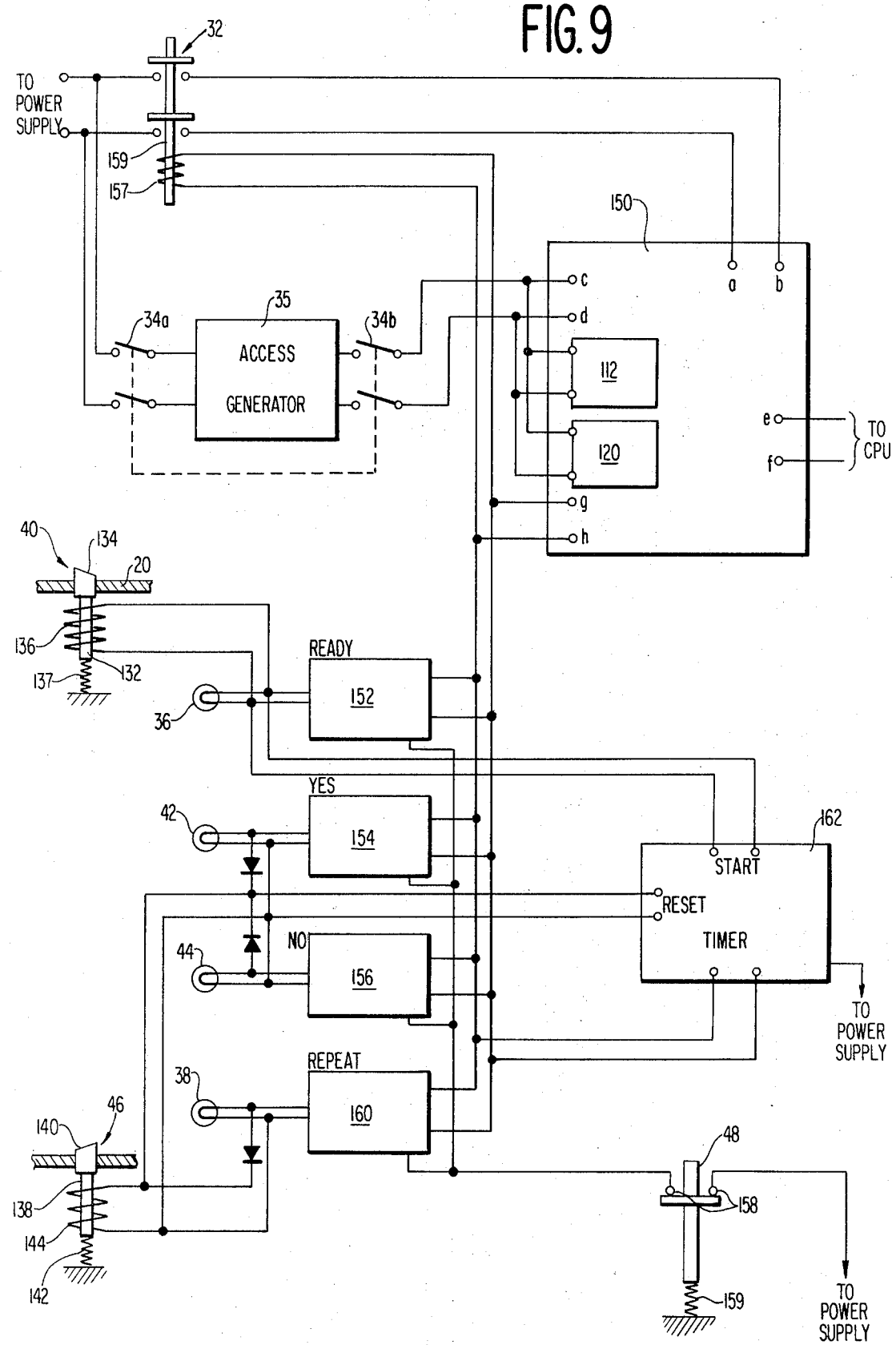

3,823,308

CREDIT CARD VERIFIER

This is a continuation of application Ser. No. 880,265, filed Nov. 26, 1969 and now abandoned.

BACKGROUND OF THE INVENTION

1. Field of the Invention

The invention relates to the field of digital data input/output units and more particularly to a credit card verifier unit for use in a credit card verification system.

2. Description of the Prior Art

The widespread use of credit cards has imposed upon the retail merchant the burden of determining whether the account represented by the number on a credit card is in good standing. The problem is an acute one for the merchant since he, rather than the company which issues the credit card, must stand the loss if he accepts a credit card for which the credit card company no longer will guarantee credit because of an overdue account, cancellation of the card, a report from the owner of the card that it has been lost or stolen, etc.

In large stores today, a clerk may use the telephone to check with a central office to determine the status of a credit card. However, with nationwide credit cards, such as oil company credit cards, the individual service station operator must rely upon long lists of invalid credit cards. These lists are sent to him periodically, such as weekly, by the credit card company. Because of the inconvenience and impracticability of referring to such long lists which also are not up-to-date, service station operators generally ignore them with the result that they accept invalid credit cards for sales, the amount of which is deducted by the credit card company from the payment made by the credit card company to the service station operator. Consequently, there is a great need for a simple low cost credit card verifier for the use of individual merchants, such as gasoline service station operators.

SUMMARY OF THE INVENTION

Therefore, the primary object of the invention is to satisfy this need by providing a low cost credit card verifier unit which would permit the individual merchant to make an instantaneous and accurate check of the status of any card presented him from any number of credit card issuing companies.

Another object of the invention is to provide such a verifier unit which may be used in combination with a standard credit card imprinter.

Another object is to provide a credit card verifier unit having a particular structure which is more versatile and more inexpensively fabricated than is available in the prior art.

The invention may be summarized briefly as a credit card verifier unit to be used in a credit card verification system including a time-shared central processing unit which is adapted to be placed in communication with the verifier unit by means of, for example, a telephone line, microwave link, or direct cable. The verifier unit may contain a conventional telephone touch-tone generator and adjustable tone selector means which may be set by a merchant to positions corresponding to the digits in the code of a credit card. The selector means may then be manually or semi-automatically actuated to cause the tone generator to transmit code-identifying tones to the central processing unit which almost immediately transmits back to the verifier unit a status signal indicating the up-to-date status of the credit card.

In one embodiment of the invention, the tone selectors are adjustable buttons which are manually set by the operator. After the buttons are set, a roller on the verifier unit is moved by the merchant over the buttons to transmit a series of tones over a conventional telephone lines to the CPU. The status signal from the CPU is also transmitted over the telephone line back to the verifier unit where lamps indicate the status of the credit card to the merchant.

Other objects, advantages and embodiments of the invention will become apparent from the following detailed description and accompanying drawing.

BRIEF DESCRIPTION OF THE DRAWING

FIG. 1 is a block diagram of one type of credit card verification system in which the novel credit card verifier of the invention may be used.

FIG. 2 is a top view of a preferred embodiment of the novel credit card verifier unit.

FIG. 3 is a cross-sectional view taken along line 3—3 in FIG. 2.

FIG. 4 is a top view of the interior of the verifier.

FIG. 5 is a cross-sectional view taken along line 5—5 in FIG. 2.

FIG. 6 is a sectional view taken along line 6—6 in FIG. 2.

FIG. 7 is a sectional view of a digit set button.

FIG. 8 is a sectional view showing the interior of the verifier unit.

FIG. 9 is a block diagram of the electrical circuits of the verifier.

FIG. 10 is a top view of a modification of the verifier unit.

FIG. 11 is a top view of another modification of the verifier unit.

FIGS. 12 and 13 illustrate still another modification of the credit card verifier unit of this invention.

DETAILED DESCRIPTION OF THE PREFERRED EMBODIMENTS

FIG. 1 is a block diagram of one type of credit card verification system in which the novel credit card verifier of the invention may be used. Tones representing the credit card issuing company and the number imprinted upon a credit card are generated in the novel credit card verifier unit 10 and transmitted via a telephone line 12 to a tone-to-digital converter 14 which changes the tones to digital signals of the type used by a time-shared computer or central processing unit (CPU) 16. These digital signals are then fed to the CPU which is programmed to check the status of the credit card and transmit to a digital-to-tone converter 18 digital signals indicative of the status of the credit card. Converter 18 changes the digital signals to tones which are then transmitted via the same telephone line 12 back to the credit card verifier unit 10 to energize indicating means, such as lamps, which display the status of the credit card. Instead of a telephone line, a cable or microwave link could be used as the communication means between the CPU and the verifier unit.

FIG. 2 is a top view of the preferred embodiment of a credit card verifier unit 10 which might be used at a typical service station, for example, for permitting the service station operator quickly to verify the status of a credit card presented to him by a customer.

The verifier unit 10 consists of a main frame 20 having 10 digit set buttons DSB 1, DSB 2 ... DSB 9, DSB 0, which are adjustably movable in corresponding slots S1, S2 ... S9, S0. Extending along the length of each slot are graduations representing the 10 decimal numerals 1, 2 ... 9, 0. As will be described in more detail later, these 10 digit set buttons correspond to the 10 digit code on a standard credit card. The buttons are manually set or adjusted by the operator to positions opposite the numbered graduations corresponding to the numerical code on the credit card. Of course, it is to be understood that letters or other symbols could be used, even though numerals are the most common form of code. As will be described in more detail later, a conventional touch tone generator is located below these slots for the purpose of generating a series of electrical tone signals corresponding to the numbers represented by the positions of the digit set buttons.

Another digit set button DSB 11 is adjustably movable in a corresponding slot S11 and arranged to operate another tone generator. This button also has 10 possible positions corresponding to numbered graduations 11, 12 ... 19, 20 which identify 10 credit card companies. DSB 11 is defined as a foreign card button and permits the service station operator to check the status of credit cards issued by other i.e., foreign credit card companies in addition to the company with which the service station is primarily associated. In other words, when the credit card operator transmits a credit card code to the CPU, he also will set DSB 11 in the position corresponding to the company which issued the credit card to be verified and transmit along with the credit card code a tone corresponding to the position of DSB 11 and identifying the company which issued the card.

In corresponding positions above each of the slots S11, S1, S2 ... S9, S0 are 11 apertures A11, A1, A2 ... A9, A0, through which may be viewed the numbers corresponding to the positions of the digit set buttons. As will be explained in more detail below, the numbers viewed in these apertures are printed on drums or wheels which are rotated in synchronism with the movement of the digit set buttons.

Also formed in the main frame 20 are two longitudinal slots 22 and 24 in which a roller assembly 26 is adapted to slide. The details of this assembly will be presented in more detail in the following figures. However, it consists essentially of a roller 28 mounted for rotation in a roller frame 30.

Also mounted on main frame 20 is an on/off switch 32 which is actuated by the operator to make a connection to the telephone line 12, i.e. to obtain a dial tone. A CPU access button 34 is then actuated by the operator to access or dial the CPU to determine whether the CPU is ready to receive an inquiry, i.e. a credit card code, from the credit card verifier unit 10. Button 34 operates a special tone generator which emits a predetermined CPU access signal consisting of a tone or series of tones. When the CPU receives the access signal and it is available to receive an inquiry, the CPU returns a ready signal which energizes a ready lamp 36 on the verifier unit 10, thereby indicating to the operator that the CPU is ready to receive a credit card code. If the CPU is busy or otherwise not ready to receive an inquiry, a repeat signal is returned by the CPU to energize a repeat lamp 38, thereby indicating to the operator that he must once again attempt to gain access to the CPU by actuating the CPU access button 34. The CPU transmits a disconnect signal following each status or repeat signal. This disconnect signal automatically returns on/off switch to its off position, thereby disconnecting the credit card verifier unit 10 from the telephone line.

A left restriction 40 is spring-biased upwardly so that it normally protrudes upwardly from the top of main frame 20 to prevent the roller assembly 26 from being moved to the right. However, upon energization of the ready lamp 36, restriction 40 is automatically lowered to permit the roller assembly to be moved to the right. To verify the status of a credit card, the operator then transmits the credit card company identifying symbol and the credit card code to the CPU by moving the roller assembly 26 to the right, thereby causing the roller 28 to depress in sequence the positioned digit set buttons DSB 11, 1, 2 ... 9, 0 to cause tones corresponding to the positions of the buttons to be transmitted to the CPU. If the CPU determines that the credit card represented by the transmitted code has a good status, it then returns a yes signal to energize a green lamp 42. If the CPU determines that the credit card has a bad status, it returns a no signal to energize the red lamp 44. Once ready lamp 36 has been energized, if neither a yes, no or repeat signal is received after a predetermined amount of time, then the repeat lamp 38 is automatically energized by a timer to indicate to the operator that he must again access the CPU and transmit the credit card code.

When the roller assembly 26 is moved to the right over the digit set buttons to transmit the code to the CPU, the assembly rides over a right restriction 46 which is spring-biased upwardly but which is shaped to permit the assembly to ride over it when the assembly is moving to the right. However, once the roller assembly has moved over restriction 46 to the extreme right-hand position on frame 20, the restriction blocks the return of the roller assembly to its lefthand position until one of the lamps 38, 42 or 44 has been energized. Energization of one of these lamps causes restriction 46 to be lowered so that the operator may then return the roller assembly to its lefthand position where it is permitted to ride over the left restriction 40.

In returning to its lefthand position, the roller 28 actuates reset switch 48 to de-energize any of the lamps 36, 38, 42 and 44 which may have been energized. As will be described in more detail below, the ready, status and repeat signals from the CPU energize relay holding circuits in the credit card verifier unit, these circuits maintaining the appropriate lamps energized until the reset switch 48 is operated by the return of the roller assembly 26 to its extreme lefthand position.

For purposes of illustration only, DSB 11 is set in the position corresponding to a tone or series of tones identified by the numeral 12, and the digit set buttons DSB 1, DSB 2 ... DSB 9, DSB 0 are set in the positions corresponding to a credit card code or number of 123 456 789 0.

FIGS. 3 – 8 illustrate the structural details of a preferred form of the verifier unit 10. These figures illustrate the details of the roller assembly 26 and the digit set buttons, and also the manner in which the tones are generated.

As shown in FIG. 6, fixed to the undersurface of main frame 20 is a pair of depending support members 50 and 52 containing slots 54 and 56, respectively. The roller frame 30 consists of a horizontal member 58 and two vertical side members 60 and 62 having lower extensions 64 and 66 respectively which project through the slots 22 and 24 in main frame 20. Shoulders 68 and 70 of the vertical side members 60 and 62 rest on the top surface of the main frame 20. The extensions 64 and 66 have outwardly extending flange portions 72 and 74 which fit into the slots 54 and 56 which act as guides to keep the roller assembly 26 properly aligned during its movement back and forth across the surface of the main frame 20.

Formed in the side members 60 and 62 of the roller frame 30 are a pair of holes 76 and 78 respectively which received extensions 80 and 82 fixed to opposite sides of roller 28. These extensions may be mounted in suitable bearings to permit the roller 28 easily to rotate as the assembly 26 is moved longitudinally across the surface of the main frame 20. A handle 81 is fixed to the horizontal member 58 to facilitate operation of the assembly 26.

FIG. 7 illustrates the details of the digit set buttons. Since these buttons are all identical, digit set button DSB 1 is chosen for illustration. An outer shell 90 is inserted in the slot S1 so that the edges 92 and 94 of the slot fit between pairs of flanges 96, 98 and 100, 102, respectively, formed on the upper end of the shell 90. Such a structure permits the shell to slide back and forth through the slot across the credit card verifier unit main frame. A circular opening 104 is formed in the bottom of the shell 90.

Mounted within shell 90 is a pushbutton 106 having a rounded top surface 107 and a downwardly extending rod 108. A spring 109 surrounds the rod 108 and is confined between the bottom of the shell 90 and the shoulder 110 on pushbutton 106. Spring 109 normally urges pushbutton 106 upwardly, and a washer 111 fixed to a reduced portion of rod 108 keeps the pushbutton in the normal position shown, thereby preventing the pushbutton from popping out of shell 90 when the pushbutton is released. Through such an arrangement, the pushbutton 106 is depressed downwardly when a downward force is applied to the surface 107, thereby causing the rod 108 to move downwardly through the aperture 104. However, as soon as the force is removed, the pushbutton returns to its normal upward position which is determined by the engagement of washer 111 with the lower surface of shell 90.

FIGS. 3, 4, 5, 6 and 8 illustrate the means by which the digit set buttons DSB 1, DSB 2 . . . DSB 9, DSB 0 actuate a conventional telephone touch tone generator 112. The generator 112 has ten pushbuttons PB 1, PB 2 . . . PB 9, PB 0 corresponding to ten different tones which the generator 112 is capable of generating. Ten bars B 1, B 2 . . . B 9, B0 extend longitudinally beneath the surface of the main frame 20 and are horizontally spaced (as viewed in FIG. 4) such that bar B 1 is directly below the 1 graduations on the slots S1, S2 . . . S9, S0, bar B 2 is directly under the graduations 2 on the slots, etc.

All of the bars are identically mounted and details of the mounting for bar B 0 as an example are illustrated in FIGS. 3 and 4. The righthand end of the bar has fixed thereto a pin 113 which is pivotably mounted in a vertical slot 114 in a support member 115 fixed to main frame 20. A spring 116 normally biases the bar in a horizontal position as illustrated in FIG. 3. The bar has a downwardly extending portion 118 on its lefthand end. This portion is positioned directly above the touch tone pushbutton PB 0. The spring 116 is slightly stronger than the springs (not shown) in tone generator 112 and permits the rod to move downwardly in slot 114 when the bar is depressed by DSB 0. This downward movement compensates for the differences in angular deflection of the lefthand ends of the bars, which deflection is considerably greater for DSB 0 than for DSB 1, for example. Consequently, possible damage to the digit set buttons, bars, or telephone generator pushbuttons is prevented. The depressed position of bar B4 is clearly illustrated in FIG. 8.

Any one or more of the digit set buttons DSB 1, DSB 2 . . . DSB 9, DSB 0 may be positioned above the bar B 0, but for the present illustration, we will assume that DSB 0 is so positioned. Consequently, when the roller 28 slides over the surface 107 of pushbutton 106 of DSB 0, the button will be depressed downwardly so that the rod 108 forces bar B 0 downwardly against the action of spring 116 to cause the extension 118 to depress pushbutton PB 0, thereby generating a 0 tone. When the roller leaves DSB 1, the digit set button DSB 0 returns to its upward position by virtue of the action of spring 116. This return action permits each pushbutton of the tone generator 112 to be actuated by any one or more of the bars. In this manner, a sequence of ten tones, representing the code on the credit card, is transmitted to the CPU.

As shown in FIGS. 3, 4 and 6, a separate tone generator 120 is disposed under the slot S11 and has a linear array of ten pushbuttons PB 11, PB 12 . . . PB 20 corresponding to the ten positions of the digit set button DSB 11. The generator 120 is positioned so that its pushbuttons are spaced between the bars B 1, B 2 . . . B 0, so that the pushbuttons do not interfere with the downward movement of the bars. The structure of digit set button DSB 11 is identical to that of digit set buttons DSB 1, DSB 2 . . . DSB 9, DSB 0. Consequently, when the roller 28 is moved from its lefthand position, towards the right on main frame 20, 14 first passes over the digit set button DSB 11 to depress it and cause it to engage and depress one of the pushbuttons PB 11, PB 12 . . . PB 19, PB 20 which correspond to ten different tones which can be generated by the tone generator 120. This credit card company tone always precedes the ten tones corresponding to the credit card code.

FIGS. 5 and 6 illustrate the manner in which the credit card company identifying number and credit card code are presented for viewing in the apertures A 11, A 1, A 2, A 3 . . . A 9, A 0 in the main frame as illustrated in FIG. 2. Again, we would look at one digit set button and one aperture since they are all identical. For example, in FIG. 5 DSB 0 is fixed to a thin flexible metal strip 122 which passes around an idler roller 124 and is wound on a spool 126 fixed to a number drum 128. The number drum 128 is spring-biased in the direction indicated by arrow 130. However, the bias force is less than the frictional force resisting movement of DSB 0 in its slot S 0. DSB 0 is shown in its 0 position in the slot, and therefore the number 0 on drum 128 is displayed in aperture A 0. The numbers on the drum are spaced so that, as DSB 0 is moved to the left (FIG. 5), the drum 128 rotates to display in the aperture the number corresponding to the position of DSB 0. FIG. 6 illustrates the number drum 128 connected to DSB 11 where DSB 11 is in the 12 position.

FIGS. 8 and 9 illustrate the locations and structure of the left restriction 40 and the right restriction 46. Left restriction 40 includes a vertical rod 132 protruding through the top of the main frame 20 and having an inclined top surface 134 which slants downwardly from left to right. Rod 132 is of magnetic material and is surrounded by a solenoid or coil 136 which is adapted to be energized when the ready lamp 36 is energized. A spring 137 normally biases rod 132 upwardly in the position illustrated to prevent the roller assembly 26 from moving from its lefthand extreme position over the restriction to the right. However, when the access lamp is energized, the solenoid is energized to draw the rod 132 downwardly thereby permitting the roller assembly to move to the right over the restriction. Because of the inclined surface 134, the roller assembly may always be moved from right to left over the restriction.

Restriction 46 is constructed in the same manner as restriction 40. It also contains a magnetic rod 138 having an inclined top surface 140 which slopes downwardly from right to left. Again, a spring 142 normally biases the rod 138 in its upward position. A solenoid or coil 144 surrounds the rod 138. When either of the lamps 38, 42 or 44 is energized, the solenoid 144 is also energized to draw the rod 138 downwardly so that the roller can be moved from right to left over the restriction. Because of the inclined surface 140, the roller assembly 26 can always overcome the force of the spring and ride over the restriction when the assembly is moving from left to right. As best illustrated in in FIGS. 2 and 5, the restrictions 40 and 46 are positioned in main frame 20 so that they engage the lower ends of the vertical extensions 60 and 62 of the roller frame 30.

FIG. 9 is a schematic diagram of the circuits contained within the verifier unit 10. The same reference numerals have been used in this figure to identify corresponding parts illustrated in the preceding figures.

Block 150 schematically illustrates a conventional touch tone telephone. To gain access to the telephone line, i.e. obtain a dial tone, the on/off switch 32 is depressed by the operator to close the circuit between the power supply and the telephone terminals a and b. The actuation of switch 32 is equivalent to lifting the receiver from a telephone. Switch 32 is of the bistable type and remains in the closed position until a force is applied to return it to its original open position. The operator then depresses the computer access button 34 which closes the ganged switches 34a and 34b to connect the generator 35 to the power supply and also to connect the generator via the telephone transmit terminals c and d to the telephone line terminals e and f. Generator 35 transmits to the CPU a tone or combination of tones which access the CPU. Switches 34a and 34b are of the self-releasing type and reopen as soon as the button 34 is released. Alternatively, the access button 34 could actuate a card dialer which would then access the CPU. If the computer is ready to accept a credit card code, it transmits to the credit card verifier unit 10 a ready signal which is converted to a tone and transmitted via the receive terminals g and h to a tuned relay 152 of the holding type (or to an equivalent electronic circuit) which is designed to be energized only by the frequency of the ready tone. Relay 152 closes an internal circuit which energizes the blue ready light 36 and also the solenoid 136 to lower the lefthand restriction 40. After the digit set buttons DSB 11, 1, 2, . . . 9, 0 are positioned by the operator, the operator then moves the roller assembly 26 across the surfaces of the digit set buttons to actuate the tone generators 120 and 112 in the manner as previously described. The tones are converted by the converter 14 into digit signals and applied to the CPU which normally returns either status signal, a yes signal or a no signal, which is converted by the converter 18 to a tone and applied via the telephone line terminals e and f to the credit card verifier unit 10. The yes and no tones have a frequency different from each other and also different from the ready tone. The yes lamp 42 is connected to a holding relay 154 which is tuned to be energized only by the frequency of the yes tone. The no lamp 44 is connected to a holding relay 156 tuned only to the frequency of the no tone.

Therefore, one or the other of the lamps 42 or 44 is energized by the status signal returned by the CPU to the credit verifier unit 10. At this point, the roller assembly 26 is in its extreme right position. Energization of either lamp 42 or 44 also energizes the solenoid 144 to lower the righthand restriction 46 which permits the roller assembly to be returned to its lefthand position. Immediately following the transmission of either a yes or no signal, the computer also transmits a disconnect signal which is converted by converter 18 to a unique tone which is fed to a solenoid 157 tuned to be energized only by the frequency of this unique disconnect tone. Energization of solenoid 157 attracts the magnetic plunger of on/off switch 32 upwardly and returns the bistable switch upwardly to its normal open position, thereby disconnecting the telephone 150 from the telephone line. After the operator has noted whether the lamp 42 or 44 is energized, he returns the roller assembly 26 to its extreme left position, thereby depressing reset switch 48 and opening its normally closed contacts 158 to interrupt the holding circuit to the tuned relays 152, 154 and 156 so that the lamps 36, 42 and 44 are de-energized. Since a spring 159 normally biases switch 48 upwardly so that the contacts 158 are normally closed, when the roller assembly is again moved to the right, switch 48 is released, and the contacts reclose to condition the holding circuits for acceptance of a unique tone. Therefore, the verifier unit is ready to transmit another credit card code.

If the CPU is unavailable or not ready to accept the credit card code when it receives an access signal, instead of a ready signal, it returns a repeat signal which is converted by converter 18 into another unique tone. Repeat lamp 38 is connected to another tuned holding relay 160 which is tuned to be energized only by the frequency of this unique tone. Alternatively, relay 160 may be designed to be energized by any tone other than those used for the ready, yes and no signals. When a repeat tone is received, relay 160 is operated to energize the amber repeat lamp 38, indicating to the operator that he must again transmit an access signal to obtain a ready light indication before transmitting the credit card code number. After every repeat signal, the computer also transmits a disconnect signal which opens the on/off switch 32 as previously described for a status signal. Reset switch 48 is depressed to interrupt the holding circuit of relay 160 to de-energize lamp 38.

Even after the computer has generated a ready signal to energize the ready light, other conditions may occur which will cause a repeat signal to be generated. For example, if an invalid code is transmitted or if the computer malfunctions, a repeat signal is automatically transmitted together with a disconnect signal in order to indicate to the operator that he must retransmit the credit card code number. In addition to energizing lamp 38, the repeat signal also energizes coil 144 to lower right restriction 46. The roller assembly is then returned to its starting lefthand position in which case the reset button 48 is depressed to de-energize the holding circuits of the tuned relays to thereby de-energize all of the indicating lamps 36, 38, 42 and 44. De-energization of the lamps also causes the coils 136 and 144 to be de-energized, thereby permitting restrictions 40 and 46 to be returned upwardly to their blocking positions.

In order to provide for the situation in which a ready signal is received but no other response is received from the CPU, a ten second timer 162 is connected between the ready lamp 36 and the repeat lamp 38. The timer cycle is started by energization of the ready lamp 36 and, if none of the lamps 38, 42 or 44 is energized within 10 seconds, the timer emits an electrical tone signal having the same frequency as a repeat tone signal from the CPU. Consequently, the tuned relay 160 is energized to energize the repeat lamp 38 and also the right restriction coil 144. The energization of any one of the lamps 38, 42, or 44 resets the timer to prepare it for the next CPU accessing operation. If the repeat lamp 38 is energized by the output of timer 162, the lamp is de-energized by depression of the reset switch 48 to momentarily open switch contacts 158 and interrupt the holding circuit of relay 160. Various blocking diodes are included in the lamp circuits to isolate them from each other.

Credit card verifier unit 10 may be conveniently mounted adjacent the credit card imprinter used by the retail merchant to imprint the credit card number on an invoice. The unit could also be bolted to the printer. It is also to be understood that the roller assembly 26 may be removed in which case the digit set buttons and reset button would be manually depressed by the operator.

FIG. 10 illustrates a modification of the preferred embodiment of the credit card verifier as described above. In the modified form, a credit card verifier unit 170 is attached to a conventional credit card imprinter 172 of the type usually found at the typical service station for imprinting the number of a credit card 174 on an invoice 176. The normal imprinter roller 177 found on such a credit card imprinter is suitably connected to the verifier unit roller 178 which passes over the digit set buttons DSB 11, DSB 1, DSB 2 ... DSB 9, DSB 0 and the reset switch button. The roller 177 is guided in tracks 180 and 182. When the imprinter roller is moved to the right to imprint the invoice with the credit card number, it carries with it the verifier roller which depresses the digit set buttons to transmit the credit card code to the CPU. Alternatively, the normal imprinter roller may be replaced by another roller which is sufficiently long to extend across both the imprinter and the verifier digit set buttons.

In another modification of the preferred embodiment illustrated in FIG. 11, the digit set buttons are not required, and the pushbuttons of a conventional tone generator 184 are sequentially depressed by the operator rather than being depressed by a roller. In this case, the credit card verifier unit 186 is also attached to a conventional credit card imprinter 188. However, the normal credit card imprinter roller 187 is left intact, and an arm 190 is fixed to the imprinter roller assembly. When the roller is moved to the right to imprint the invoice 176, arm 190 actuates the CPU access switch 192, thereby sending an access signal to the CPU. The operator then depresses one of the pushbuttons of the credit card company tone generator 194 followed by depression in sequence of the proper combination of the ten pushbuttons on tone generator 184. After a status signal is received, the operator may move roller 187 to the left. Upon return to its illustrated starting position, the roller actuates reset switch 196 to de-energize the lamps as previously described.

FIGS. 12 and 13 illustrate still another modification of the credit card verifier unit of this invention. As illustrated in FIG. 12, in this modification, each digit set button 106 is modified to have a conducting shorting bar 200 fixed to the end of the rod 108. An insulator 202 insulates the bar 200 from the rod 108.

As shown in FIG. 13, in this modification, the bars B 1, B 2 ... B 9, B 0 have been replaced by pairs of conductors or leads L 1, L 2 ... L 9, L 0 which are appropriately connected in parallel with pairs of contacts located beneath the digit set buttons. Each pair of leads corresponds to a different tone generated by tone generator 112. Each pair of leads is connected across a different pair of the terminals or switch contacts located beneath the pushbuttons (PB) on the tone generator 112. For example, the pairs of contacts underneath digit set button DSB 1 are labeled as C 1, C 2 ... C 0. The tone generator terminals corresponding to pushbutton PB 1 are labeled at T 1, those corresponding to PB 2 as T 2, etc. The contact pair C 1 below digit set button DSB 1 and the corresponding contact pairs C 1 under the other digit set buttons are all connected across or in parallel with leads L 1 which in turn are connected across or in parallel with the normally open terminals T 1 corresponding to the tone generated by actuation of the pushbutton PB 1 in the previous embodiments. In this modification, looking at digit set button DSB 1, as an example, which is in position 1, when the button is depressed by either the roller assembly or by the operator, the contacts C 1 are closed or short-circuited by the shorting bar 200, thereby closing within the tone generator 112 the internal circuit which causes the generation of the tone corresponding to pushbutton PB 1. The manner in which the leads L 1, L2 ... L 9, L 0 connect corresponding contact pairs with the proper terminal pair is clearly illustrated in FIG. 13.

Of course, it is to be understood that a ten symbol credit card code has merely been chosen as an example. Fewer symbols can be used with the illustrated embodiments of the invention, and more symbols can be used merely by suitably increasing the tone capacity of the tone generator and the number of digit set buttons and associated elements. Furthermore, in the embodiments illustrated in FIGS. 2–9, 12 and 13, the roller assembly may be removed or not used, in which case the operator manually depresses the digit set buttons in sequence and manually operates the reset switch.

I claim:

1. A credit card verifier unit for use in a credit card verification system wherein the status of a credit card identified by a multidigit code is verified comprising means for veryifying a multidigit code of a credit card including a plurality of individual selector means corresponding in number to the number of digits in said code with each individual selector means representing a different digit, means for permitting the manual selective presetting of each individual selector means by manual movement thereof to any one of a plurality of different set positions representative of values of its associated digit, a plurality of individual signal generating means each associated with a different digital value and operative in response to said individual selector means for generating a different signal for each value, and means for manually sequentially further moving said plurality of preset selector means after the presetting thereof for sequentially operating said individual signal generating means thereby generating signals in sequence and value determined by presetting of said individual selector means.

2. The credit card verifier unit as defined in claim 1 further comprising means for imprinting said preset code upon an invoice sheet or the like, and means responsive to the operation of said manual operating means for operating said imprinting means to sequentially imprint upon an invoice sheet or the like the code preset by said individual selector means.

3. The credit card verifier unit as defined in claim 1 wherein said plurality of individual signal generating means are a plurality of tone generator means for generating a plurality of different tones corresponding to different ones of the values of the digits in said code.

4. The credit card verifier unit as defined in claim 1 wherein said means for permitting the manual selective setting of each selector means is a slot through which passes and along which moves an associated selector means in a first direction, and means mounting each selector means for movement by said manually operating means in a second direction generally transverse to said first direction.

5. The credit card verifier unit as defined in claim 1 wherein said manually operating means is mounted for sliding movement for operating said plurality of selector means.

6. The credit card verifier unit as defined in claim 1 including means for selectively coupling each said selector means to each individual signal generating means, said coupling means include a plurality of bars having parallel longitudinal axes with said bars underlying said selector means with each bar corresponding to a different value of any digit in said code, and said longitudinal axes are normal to the direction of movement of said individual selector means.

7. The credit card verifier unit as defined in claim 2 wherein said plurality of individual signal generating means are a plurality of tone generator means for generating a plurality of different tones corresponding to different ones of the values of the digits in said code.

8. The credit card verifier unit as defined in claim 2 wherein said means for permitting the manual selective setting of each selector means is a slot through which passes and along which moves an associated selector means in a first direction, and means mounting each selector means for movement by said manually operating means in a second direction generally transverse to said first direction.

9. The credit card verifier unit as defined in claim 2 wherein said manually operating means is mounted for sliding movement for operating said plurality of selector means.

10. The credit card verifier unit as defined in claim 2 including means for selectively coupling each said selector means to each individual signal generating means, said coupling means include a plurality of bars have parallel longitudinal axes with said bars underlying said selector means with each bar corresponding to a different value of any digit in said code, and said longitudinal axes are normal to the direction of movement of said individual selector means.

11. The credit card verifier unit as defined in claim 4 wherein said manually operating means is mounted for sliding movement for operating said plurality of selector means.

12. The credit card verifier unit as defined in claim 4 including means for selectively coupling each said selector means to each individual signal generating means, said coupling means include a plurality of bars having parallel longitudinal axes with said bars underlying said selector means with each bar corresponding to a different value of any digit in said code, and said longitudinal axes are normal to the direction of movement of said individual selector means.

13. The credit card verifier unit as defined in claim 5 including means for selectively coupling each said selector means to each individual signal generating means, said coupling means include a plurality of bars having parallel longitudinal axes with said bars underlying said selector means with each bar corresponding to a different value of any digit in said code, and said longitudinal axes are normal to the direction of movement of said individual selector means.

14. A credit card verifier unit for use in a credit card verification system wherein the status of a credit card identified by a multidigit code is verified comprising a plurality of individual selector means corresponding in number to the number of digits in said code with each individual selector means representing a different digit, means for permitting the manual selective setting of each individual selector means by manual movement thereof to any one of a plurality of different positions representative of values of its associated digit, a plurality of individual signal generating means each associated with and operative in response to one of said individual selector means for generating a different signal for each value, means for manually sequentially further moving said plurality of selector means after the setting thereof for operating said individual signal generating means thereby generating signals corresponding to the presetting of said individual selector means, means for imprinting said preset code upon an invoice sheet or the like, and means responsive to the operation of said manual operating means for concurrently operating said imprinting means to imprint upon an invoice sheet or the like the code preset by said individual selector means.

15. The credit card verifier unit as defined in claim 14 wherein said plurality of individual signal generating means are a plurality of tone generator means for generating a plurality of different tones corresponding to different ones of the values of the digits in said code.

16. The credit card verifier unit as defined in claim 14 wherein said means for permitting the manual selective setting of each selector means is a slot through which passes and along which moves an associated selector means in a first direction, and means mounting each selector means for movement by said manually operating means in a second direction generally transverse to said first direction.

17. The credit card verifier unit as defined in claim 14 wherein said manually operating means is mounted for sliding movement for operating said plurality of selector means.

18. The credit card verifier unit as defined in claim 14 including means for selectively coupling each said selector means to each individual signal generating means, said coupling means include a plurality of bars having parallel longitudinal axes with said bars underlying said selector means with each bar corresponding to a different value of any digit in said code, and said longitudinal axes are normal to the direction of movement of said individual selector means.

19. A credit card verifier unit for use in a credit card verification system wherein the status of a credit card identification by a multidigit code is verified comprising a plurality of individual selector means corresponding in number to the number of digits in said code with each individual selector means representing a different digit, means for permitting the manual selective setting of each individual selector means by manual movement thereof to any one of a plurality of different positions representative of values of its associated digit, a plurality of individual signal generating means each associated with and operative in response to one of said individual selector means for generating a different signal for each value, means for manually sequentially further moving said plurality of selector means after the setting thereof for sequentially operating said individual signal generating means whereby generating signals in sequence and value determined by the presetting of said individual selector means, said plurality of individual signal generating means are a plurality of tone generating means for generating a plurality of different tones corresponding to different ones of the values of the digits in said code, said means for permitting the manual selective setting of each selector means is a slot through which passes and along which moves an associated selector means in a first direction, means mounting each selector means for movement by said manually operating means in a second direction generally transverse to said first direction said manually operating means is mounted for sliding movement for operating said plurality of selector means, means for selectively coupling each said selector means to each individual signal generating means, said coupling means include a plurality of bars having parallel longitudinal axes with said bars underlying said selector means with each bar corresponding to a different value of any digit in said code, said longitudinal axes are normal to the direction of movement of said individual selector means, means for placing said verifier unit in communication with a central processing unit, means for transmitting an access signal to said central processing unit, first indicating means on said verifier unit responsive to a ready signal transmitted by said central processing unit after receipt of an access signal for indicating that the central processing unit is ready to receive signals from said tone generator means, second indicating means on said verifier unit responsive to a credit card verification signal transmitted by said central processing unit to said verifier unit for indicating the credit status of the credit card corresponding to the signals from said tone generator means, third indicating means on said verifier unit energized by a repeat signal generated by said central processing unit when the latter is unready to receive signals from said generator means, means for precluding the operation of said manually operating means until receipt of said access signal from said central processing unit, and means operative by said manually operating means for resetting the verifier unit after the receipt of said credit status signal.

* * * * *